US012625832B2

(12) United States Patent
Huang et al.

(10) Patent No.: US 12,625,832 B2
(45) Date of Patent: May 12, 2026

(54) HUB DEVICE AND CONTROL SYSTEM

(71) Applicant: Pu-Dan Limited Corp., New Taipei City (TW)

(72) Inventors: Wei-Chih Huang, New Taipei City (TW); Ching Shen Chang, New Taipei City (TW)

(73) Assignee: Pu-Dan Limited Corp., New Taipei City (TW)

( * ) Notice: Subject to any disclaimer, the term of this patent is extended or adjusted under 35 U.S.C. 154(b) by 2 days.

(21) Appl. No.: 18/955,302

(22) Filed: Nov. 21, 2024

(65) Prior Publication Data

US 2025/0173293 A1 May 29, 2025

(30) Foreign Application Priority Data

Nov. 23, 2023 (TW) ................................. 112145347

(51) Int. Cl.
*G06F 13/38* (2006.01)

(52) U.S. Cl.
CPC .... *G06F 13/382* (2013.01); *G06F 2213/4002* (2013.01)

(58) Field of Classification Search
None
See application file for complete search history.

(56) References Cited

U.S. PATENT DOCUMENTS

| | | | | |
|---|---|---|---|---|
| 7,635,280 B1 * | 12/2009 | Crumlin | ............. | H01R 13/7039 |
| | | | | 439/489 |
| 9,042,383 B2 * | 5/2015 | Hendel | ................. | H04L 49/358 |
| | | | | 370/396 |
| 10,248,609 B2 * | 4/2019 | McKibben | ........... | G06Q 20/202 |
| 10,606,784 B1 * | 3/2020 | Jreij | ..................... | G06F 13/4282 |
| 2006/0179144 A1 * | 8/2006 | Nagase | ................. | G06F 13/387 |
| | | | | 710/62 |
| 2012/0127996 A1 * | 5/2012 | Grosser | ................. | H04L 45/745 |
| | | | | 370/392 |
| 2014/0344537 A1 | 11/2014 | Saitou et al. | | |
| 2025/0315397 A1 * | 10/2025 | Rogers | ............... | G06F 13/4282 |

FOREIGN PATENT DOCUMENTS

CN          112540738 A          3/2021

* cited by examiner

*Primary Examiner* — Elias Mamo
(74) *Attorney, Agent, or Firm* — Perilla Knox & Hildebrandt LLP; Kenneth A. Knox

(57) ABSTRACT

A hub device is provided. An upstream-facing port (UFP) is coupled to a host device. A downstream-facing port (DFP) is coupled to a peripheral device. A control chip is coupled to the UFP, the DFP, and a memory, and includes a first transceiver interface, a second transceiver interface, a first processing circuit, and a second processing circuit. The first transceiver interface is coupled to the UFP. The second transceiver interface is coupled to the DFP. The first processing circuit is coupled to the first and second transceiver interfaces so that the host device communicates with the peripheral device. The second processing circuit is coupled between the first processing circuit and the memory. In response to the first processing circuit receiving an access command from the host device via the first transceiver interface, the first processing circuit triggers the second processing circuit to access the memory.

16 Claims, 4 Drawing Sheets

100A

100B

HUB DEVICE AND CONTROL SYSTEM

CROSS REFERENCE TO RELATED APPLICATIONS

This Application claims priority of Taiwan Patent Application No. 112145347, filed on Nov. 23, 2023, the entirety of which is incorporated by reference herein.

BACKGROUND OF THE INVENTION

Field of the Invention

The present invention relates to a hub device, and, in particular, it relates to a hub device that comprises internal memory.

Description of the Related Art

Thanks to advancements in science and technology, there are more and more types and functions of electronic devices. In daily life, universal serial bus (USB) technology has become ubiquitous. For example, mobile phones, TVs, stereos, and printers all have USB interfaces. USB flash drives are electronic products that many people carry with them. However, most notebook computers have a limited number of connection ports, and users often cannot use the notebook computer's connection ports to connect all of their peripheral devices at once.

BRIEF SUMMARY OF THE INVENTION

In accordance with an embodiment of the disclosure, a hub device comprises an upstream-facing port, a downstream-facing port, a memory, and a control chip. The upstream-facing port is coupled to a host device. The downstream-facing port is coupled to a peripheral device. The control chip is coupled to the upstream-facing port, the first downstream-facing port, and the memory. The control chip comprises a first transceiver interface, a second transceiver interface, a first processing circuit, and a second processing circuit. The first transceiver interface is coupled to the upstream-facing port. The second transceiver interface is coupled to the first downstream-facing port. The first processing circuit is coupled to the first and second transceiver interfaces so that the host device communicates with the first peripheral device. The second processing circuit is coupled between the first processing circuit and the memory. In response to the first processing circuit receiving an access command from the host device via the first transceiver interface, the first processing circuit triggers the second processing circuit to access the memory.

In accordance with another embodiment of the disclosure, a control system comprises a host device, a peripheral device, and a hub device. The hub device is responsible for communication between the host device and the peripheral device and comprises an upstream-facing port, a downstream-facing port, a memory, and a control chip. The upstream-facing port is coupled to the host device. The downstream-facing port is coupled to the peripheral device. The control chip is coupled to the upstream-facing port, the downstream-facing port, and the memory. The control chip comprises a first transceiver interface, a second transceiver interface, a first processing circuit, and a second processing circuit. The first transceiver interface is coupled to the upstream-facing port. The second transceiver interface is coupled to the downstream-facing port. The first processing circuit is coupled to the first and second transceiver interfaces so that the host device communicates with the peripheral device. The second processing circuit is coupled between the first processing circuit and the memory. In response to the first processing circuit receiving an access command from the host device via the first transceiver interface, the first processing circuit triggers the second processing circuit to access the memory.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
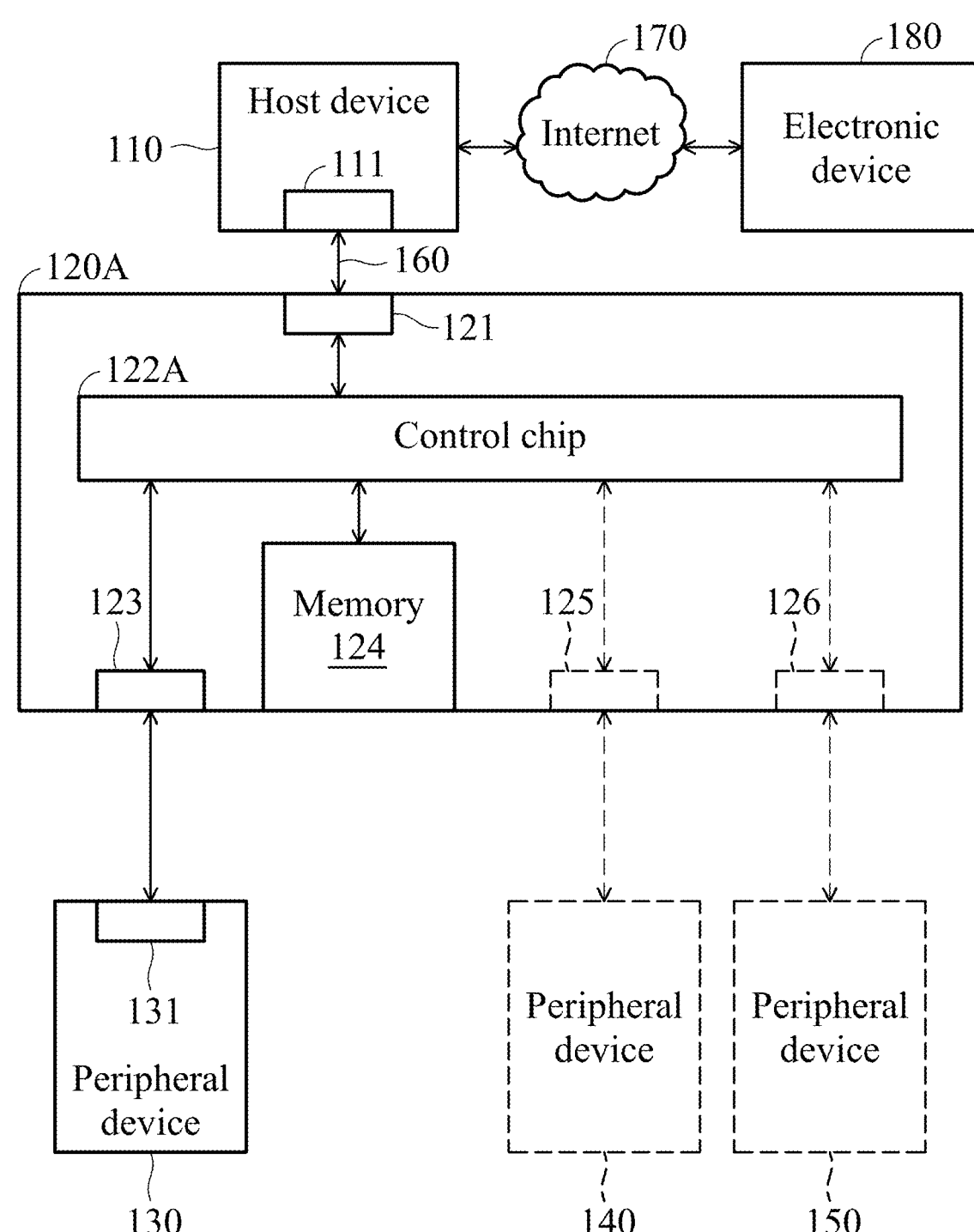
FIG. 1A is a schematic diagram of an exemplary embodiment of a control system according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1A is a schematic diagram of an exemplary embodiment of a control system according to various aspects of the present disclosure. As shown in FIG. 1A, the control system 100A comprises a host device 110, a hub device 120A, and a peripheral device 130. The hub device 120A is coupled between the host device 110 and the peripheral device 130 so that the host device 110 communicates with the peripheral device 130. In other words, the host device 110 controls the operation of the peripheral device 130 via the hub device 120A. The peripheral device 130 responses the requests of the host device 110 via the hub device 120A.

The kind of host device 110 is not limited in the present disclosure. In one embodiment, the host device 110 is a smart phone, a desktop computer, a notebook computer, or an access point (AP). In some embodiments, the host device 110 may be coupled to an internet 170. In this case, other devices (e.g., the electronic device 180) coupled to the internet 170 can connect to the hub device 120A via the host device 110. The type of peripheral device 130 is not limited in the present disclosure. In one embodiment, the peripheral device 130 is a home appliance, such as a television or a stereo. In another embodiment, the peripheral device 130 is a computer peripheral device, such as a printer, a monitor, a flash drive, etc.

In other embodiments, the control system 100A further comprises peripheral devices 140 and 150. The peripheral devices 140 and 150 are connected to the host device 110 via the hub device 120A. Since the characteristics of the peripheral devices 140 and 150 are similar to the characteristics of the peripheral device 130, the related description is omitted here. The hub device 120A is responsible for communication between the host device 110 and the peripheral devices 130, 140 and 150. At the same time, only a single peripheral device communicates with the host device 110. For example, when the host device 110 points to the peripheral device 130, the hub device 120A provides the message sent by the host device 110 to the peripheral device 130, and provides the message sent by the peripheral device 130 to the host device 110.

The hub device 120A comprises an upstream-facing port 121, a control chip 122A, a downstream-facing port 123, and a memory 124. The upstream-facing port 121 is coupled to the host device 110. In one embodiment, the host device 110 comprises a connection port 111. The connection port 111 is coupled to the upstream-facing port 121. The type of upstream-facing port 121 is not limited in the present disclosure. In one embodiment, the upstream-facing port 121 is a USB Type-A connection port, a USB Type-C connection port or a local area network (LAN) connection port. In this case, the type of connection port 111 is the same as the type of upstream-facing port 121. For example, the upstream-facing port 121 and the connection port 111 are USB Type-C connection ports or the LAN connection ports.

In some embodiments, the connection port 111 is coupled to the upstream-facing port 121 via a connection line 160. The type of connection line 160 is not limited in the present disclosure. The connection line 160 may be a USB connection line or a network connection line. In another embodiment, the connection port 111 is directly plugged into the upstream-facing port 121. In other embodiments, the connection port 111 uses a wireless transceiver technology to transmit data with the hub device 120A. In this case, each of the connection port 111 and the upstream-facing port 121 comprises a wireless transceiver (not shown). The wireless transceiver of the connection port 111 receives the wireless signals from the upstream-facing port 121 and sends the wireless signals to the upstream-facing port 121. Similarly, the wireless transceiver of the upstream-facing port 121 receives the wireless signals from the connection port 111 and sends the wireless signals to the connection port 111.

The downstream-facing port 123 is coupled to the peripheral device 130. In one embodiment, the peripheral device 130 comprises a connection port 131. The connection port 131 is coupled to the downstream-facing port 123. The type of downstream-facing port 123 is not limited in the present disclosure. In one embodiment, the downstream-facing port 123 is a USB Type-A connection port or a USB Type-C connection port. In this case, the type of connection port 131 is the same as the type of downstream-facing port 123. For example, the downstream-facing port 123 and the connection port 131 are USB Type-C connection ports. Additionally, the type of downstream-facing port 123 may be the same or different from the type of upstream-facing port 121. For example, the upstream-facing port 121 is a USB Type-C connection port and the downstream-facing port 123 is a USB Type-A connection port or a USB Type-C connection port.

In some embodiments, the hub device 120A further comprises downstream-facing ports 125 and 126, but the disclosure is not limited thereto. In other embodiments, the hub device 120A comprises more downstream-facing ports or fewer downstream-facing ports. In this embodiment, the downstream-facing port 125 is coupled to the peripheral device 140. The downstream-facing port 126 is coupled to the peripheral device 150. The types of downstream-facing ports 123, 125, and 126 are not limited in the present disclosure. In one embodiment, the type of at least one of the downstream-facing ports 123, 125 and 126 is the same as or different from the type of another of the downstream-facing ports 123, 125 and 126. Since the characteristics of the downstream-facing ports 125 and 126 are similar to the characteristics of the downstream-facing port 123, the related description is omitted here. Additionally, the type of peripheral devices 130, 140 and 150 are not limited in the present disclosure. In one embodiment, the type of at least one of the peripheral devices 130, 140, and 150 is the same as or different from the type of another of the peripheral devices 130, 140, and 150.

The control chip 122A is coupled to the upstream-facing port 121 and the downstream-facing ports 123, 125, and 126 to provide communication between the host device 110 and the peripheral devices 130, 140 and 150. The control chip 122A may transmit the information from the upstream-facing port 121 to one of the downstream-facing ports 123, 125, and 126 or transmit the information from one of the downstream-facing ports 123, 125, and 126 to the upstream-facing port 121.

Taking the peripheral device 130 as an example, when the host device 110 points to the peripheral device 130, the control chip 122A transmits the information provided by the host device 110 to the peripheral device 130 and transmits the information sent from the peripheral device 130 to the host device 110. In some embodiments, the protocol for data transmission between the control chip 122A and the downstream-facing ports 123, 125, and 126 is a serial transmission protocol. Therefore, the downstream-facing ports 123, 125 and 126 can also be referred to as serial ports.

In this embodiment, the control chip 122A stores data from the host device 110 to the memory 124 or output data stored in the memory 124 to the host device 110. In some embodiment, the protocol for data transmission between the control chip 122A and the memory 124 is a parallel transmission protocol.

In this embodiment, the memory 124 is independent of the control chip 122A. The memory 124 and the control chip 122A are combined in the hub device 120A. The type of memory 124 is not limited in the present disclosure. The memory 124 may be a non-volatile memory (NVM). For example, the memory 124 is a NAND flash. In another embodiment, the memory 124 is a magnetic random-access memory (MRAM) or a solid-state disk (SSD). Furthermore, the number of memories is not limited in the present disclosure. In one embodiment, the hub device 120A comprises more memories. These memories are independent of each other and independent of the control chip 122A. In this case, the host device 110 may direct the control chip 122A to store the corresponding data in the corresponding memory.

Figure 1B:
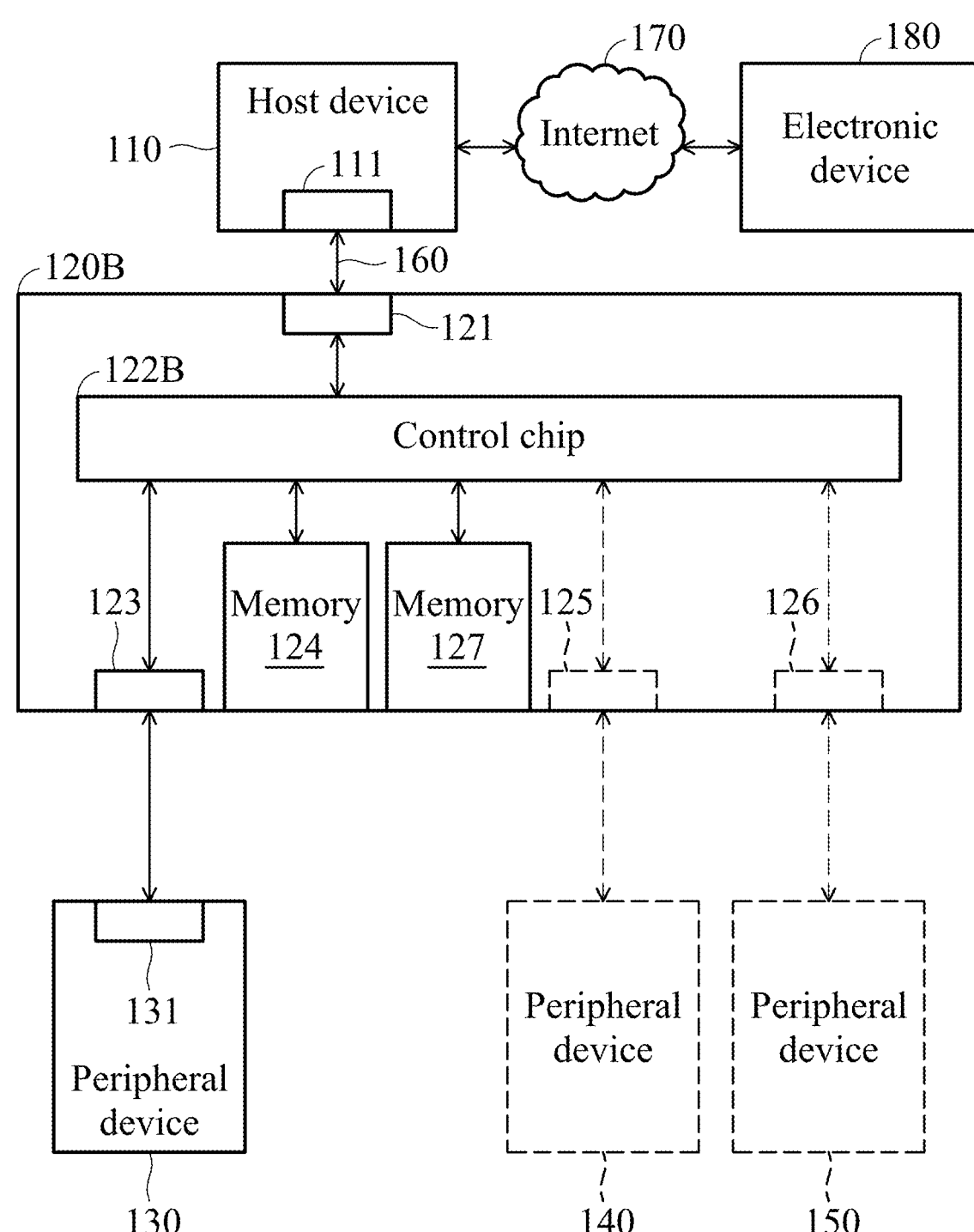
FIG. 1B is a schematic diagram of another exemplary embodiment of the control system according to various aspects of the present disclosure.

FIG. 1B is a schematic diagram of another exemplary embodiment of the control system according to various aspects of the present disclosure. FIG. 1B is similar to FIG. 1A with exception that the hub device 120B further comprises a memory 127. The control chip 122B assigns the data from the host device 110 into the memories 124 and 127

In one embodiment, when a specific application program of the host device 110 is activated, the user can use the specific application program to direct the control chip 122B to enter different writing modes. For example, in a first writing mode, the control chip 122B divides the data provided by the host device 110 into a plurality of data groups. The amount of data in one of the data groups may be the same as or different from the amount of data in another of the data groups. The present disclosure does not limit the number of data groups. For brevity, assume that the control chip 122B divides the specific data provided by the host device 110 into first to fourth data groups.

In this case, the control chip 122B may first store the first data group in the memory 124 and then store the second data group in the memory 127. Next, the control chip 122B stores the third data group in the memory 124, and then stores the fourth data group in the memory 127. Since the control chip 122B alternately stores data in different memories, the speed at which the control chip 122B stores data can be increased. The present disclosure does not limit the number of storage devices. In other embodiments, the hub device 120B has more storage devices. In this case, the control chip 122B writes different data groups into different storage devices.

In some embodiment, although the control chip 122B has the memories 124 and 127, the host device 110 treats memories 124 and 127 as a single memory. When the host device 110 wants to read the specific data, the control chip 122B first reads the first data group stored in the memory 124 and then reads the second data stored in the memory 127 according to an access request sent from the host device 110. Then, the control chip 122B reads the third data group stored in the memory 124, and then reads the fourth data group stored in the memory 127. The control chip 122B sequentially outputs the first to fourth data groups to the host device 110.

In another embodiment, when the control chip 122B operates in a second writing mode, the control chip 122B simultaneously stores the data provided by the host device 110 to the memories 124 and 127. In other words, the data stored in the memory 124 is the same as the data stored in the memory 127. In this case, the memory 124 may serve as a primary memory, and memory 127 may serve as a backup memory.

When the host device 110 is coupled to the hub device 120B, the host device 110 will only discover the memory 124 but not the memory 127. Therefore, when the host device 110 issues an access request, the control chip 122B provides the data stored in the memory 124 to the host device 110. When the data in the memory 124 is damaged, the control chip 122B may copy the data in the memory 127 to the memory 124, thereby improving the security of the data.

Since the characteristics of the control chip 122B are similar to the characteristics of the control chip 122A, the related description is omitted here. Additionally, since the characteristics of the memory 127 are similar to the characteristics of the memory 124, the related description is omitted here.

Figure 2A:
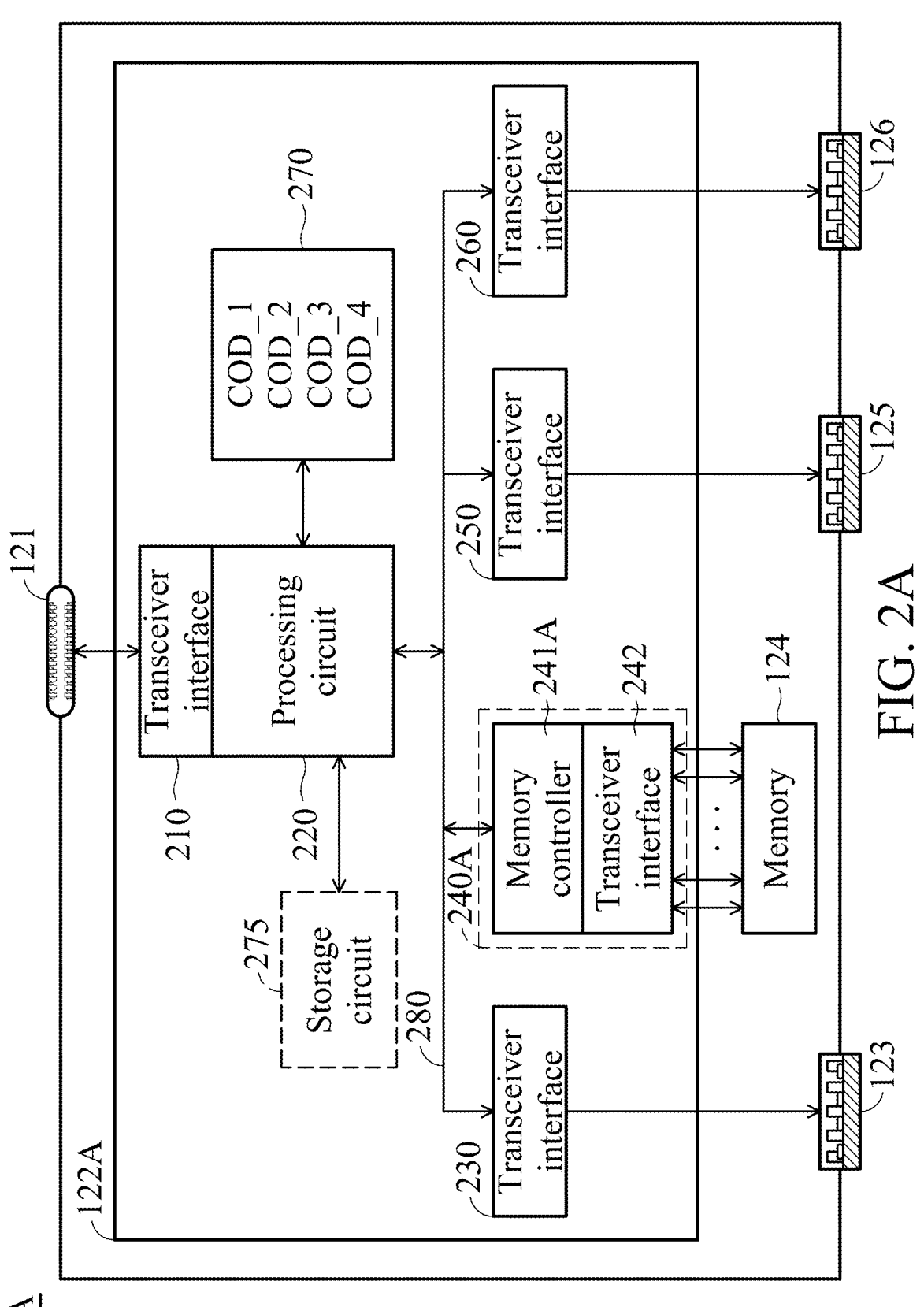
FIG. 2A is a schematic diagram of an exemplary embodiment of a hub device according to various aspects of the present disclosure.

FIG. 2A is a schematic diagram of an exemplary embodiment of a hub device according to various aspects of the present disclosure. The hub device 120A is a USB hub. The version of the hub device 120A is not limited in the present disclosure. The version of the hub device 120A may be USB 2.0, USB 3.x (USB 3.0, USB 3.1, USB 3.2), or USB 4.0 or above. Furthermore, assumes that the upstream-facing port 121 is a USB Type-C connection port, the downstream-facing ports 123, 125, and 126 are USB Type-A connection ports, but the disclosure is not limited thereto. In other embodiments, the upstream-facing port 121, and the downstream-facing ports 123, 125 and 126 are other types of connection ports. The type of upstream-facing port 121 may be the same as or different from the type of one of downstream-facing port 123, 125 and 126.

The control chip 122A transmits the information received by the upstream-facing port 121 to the memory 124, the downstream-facing port 123, 125, or 126. The control chip 122A may transmit the information stored in the memory 124 or the information received by the downstream-facing ports 123, 125, or 126 to the upstream-facing port 121. In this embodiment, the control chip 122A comprises transceiver interfaces 210, 230, 250, and 260, and processing circuits 220 and 240A.

The transceiver interface 210 is coupled between the upstream-facing port 121 and the processing circuit 220 to transmit the signals from the upstream-facing port 121 to the processing circuit 220 and transmit the signals from the processing circuit 220 to the upstream-facing port 121. In one embodiment, the protocol for data transmission between the transceiver interface 210 and the upstream-facing port 121 matches a serial transmission protocol.

The structure of transceiver interface 210 is not limited in the present disclosure. In one embodiment, the transceiver interface 210 comprises a USB transceiver PHY. In this case, the transceiver interface 210 first converts the signal from the upstream-facing port 121 into a signal suitable for processing by the processing circuit 220, and then provides the converted result to the processing circuit 220. For example, the transceiver interface 210 converts the signal from the upstream-facing port 121 from a serial format (such as 2 bits) to a parallel format (such as 8 bits/16 bits/32 bits/64 bits), and then provides the signal in parallel format to the processing circuit 220.

Additionally, the transceiver interface 210 converts the output signal of the processing circuit 220 into a signal suitable for transmission by the upstream-facing port 121, and then provides the converted result to the upstream-facing port 121. For example, the transceiver interface 210 converts the signal from the processing circuit 220 from a parallel format (such as 8 bits/16 bits/32 bits/64 bits) into a serial format (such as 2 bits), and then provides the signal in serial format to the upstream-facing port 121.

The processing circuit 220 is coupled between the transceiver interfaces 210, 230, 250, and 260, so that a host device communicates with any one of the three peripheral devices (respectively coupled to the downstream-facing ports 123, 125, and 126). For example, assume that the processing circuit 220 determines that the host device 110 points to the downstream-facing port 123 according to the information from the transceiver interface 210. In this case, the processing circuit 220 provides the information from the transceiver interface 210 to the transceiver interface 230 via the bus 280. Additionally, the processing circuit 220 receives the information from the transceiver interface 230 via the bus 280 and then outputs the information from the transceiver interface 230 to the transceiver interface 210.

In other embodiments, when the host device 110 points to the memory 124, the processing circuit 220 outputs the information to the processing circuit 240A via the bus 280. The processing circuit 240A stores the information output from the processing circuit 220 to the memory 124. Furthermore, the processing circuit 220 may receive the information output from the processing circuit 240A via the bus 280 and then provide the information output from the processing circuit 240A to the transceiver interface 210. The kind of bus 280 is not limited in the present disclosure. In one embodiment, the bus 280 is a parallel bus.

The structure of processing circuit 220 is not limited in the present disclosure. In one embodiment, the processing circuit 220 is a control logic circuit. In some embodiments, the control chip 122A further comprises a memory 270. The memory 270 stores a management program code COD_1. The type of memory 270 is not limited in the present disclosure. In one embodiment, the memory 270 is an NVM.

In some embodiments, the management program code COD_1 is a USB management program. The processing circuit 220 executes the management program code COD_1 for data distribution. For example, the processing circuit 220 executes the management program code COD_1 to decode the signal from the transceiver interface 210. The processing circuit 220 determine that a host device (coupled to the upstream-facing port 121) points to the memory 124, the downstream-facing ports 123, 125 or 126, and then provides the signal to the memory 124, the downstream interface 123, 125 or 126 according to the decoding result.

The transceiver interface 230 is coupled between the processing circuit 220 and the downstream-facing port 123 to transmit the information output from the processing circuit 220 to the downstream-facing port 123 and transmit the information from the downstream-facing port 123 to the processing circuit 220. In one embodiment, the transceiver interface 230 uses a serial transmission method to transmit serial data to the downstream-facing port 123 and receive another serial data from the downstream-facing port 123.

In some embodiments, the protocol for data transmission between the transceiver interface 230 and the processing circuit 220 is different from the protocol for data transmission between the transceiver interface 230 and the downstream-facing port 123. For example, the protocol for data transmission between the transceiver interface 230 and the processing circuit 220 is a parallel transmission protocol, and the protocol for data transmission between the transceiver interface 230 and the downstream-facing port 123 is a serial transmission protocol. In other embodiment, the protocol for data transmission between the transceiver interface 210 and the upstream-facing port 121 is the same as the protocol for data transmission between the transceiver interface 230 and the downstream-facing port 123, such as a serial transmission protocol.

The structure of transceiver interface 230 is not limited in the present disclosure. In one embodiment, the transceiver interface 230 comprises a USB transceiver PHY. In this case, the transceiver interface 230 first converts the signal from the processing circuit 220 into a signal suitable for transmission by the downstream-facing port 123, and then provides the converted result to the downstream-facing port 123. For example, the transceiver interface 230 converts the signal from the processing circuit 220 from a parallel format (such as 8 bits/16 bits/32 bits/64 bits) to a serial format (such as 2 bits), and then provides the signal in serial format to the downstream-facing port 123.

Additionally, the transceiver interface 230 converts the output signal of the downstream-facing port 123 into a signal suitable for processing by the processing circuit 220, and then provides the converted result to the processing circuit 220. For example, the transceiver interface 230 converts the signal from the downstream-facing port 123 from a serial format (such as 2 bits) to a parallel format (such as 8 bits/16 bits/32 bits/64 bits), and then provides the signal in parallel format to the processing circuit 220. The processing circuit 220 provides the signal in parallel format to the transceiver interface 210.

The transceiver interface 250 is coupled between the processing circuit 220 and the downstream-facing port 125 to transmit the information output from the processing circuit 220 to the downstream-facing port 125 and transmit the information from the downstream-facing port 125 to the processing circuit 220. The transceiver interface 260 is coupled between the processing circuit 220 and the downstream-facing port 126 to transmit the information output from the processing circuit 220 to the downstream-facing port 126 and transmit the information from the downstream-facing port 126 to the processing circuit 220. Since the characteristics of the transceiver interfaces 250 and 260 are similar to the characteristics of the transceiver interface 230, the related description is omitted here.

In some embodiments, when the downstream-facing ports 123, 125 and 126 are USB connection ports, each of the transceiver interfaces 230, 250 and 260 has a USB transceiver PHY. In this case, the number of USB transceivers PHY is related to the number of downstream-facing ports. In other embodiments, when the hub device 120A has other numbers (such as 2) of downstream-facing ports, the control chip 122A also has the same number (such as 2) of USB transceiver PHY.

The processing circuit 240A is coupled between the processing circuit 220 and the memory 124 and accesses the memory 124 according to the information output from the processing circuit 220. For example, when the processing circuit 220 receives an access command from a host device via the transceiver interface 210, the processing circuit 220 triggers the processing circuit 240A to direct the processing circuit 240A to access the memory 124.

In one embodiment, the processing circuit 220 may utilize the transceiver interface 210 to receive write data. In this case, the processing circuit 220 triggers the processing circuit 240A to direct the processing circuit 240A to store the write data in the memory 124. In another embodiment, the processing circuit 220 directs the processing circuit 240A to read the memory 124 to provide read data. In this case, the processing circuit 220 outputs the read data to the transceiver interface 210.

The number of memories 124 is not limited in the present disclosure. In other embodiments, the hub device 120A comprises more memories 124. In this case, all memories 124 are controlled by the same processing circuit 240A. In another embodiment, different memories 124 corresponds to different processing circuits. The structure of processing circuit 240A is not limited in the present disclosure. In one embodiment, the processing circuit 240A comprises a memory controller 241A and a transceiver interface 242.

The memory controller 241A is coupled between processing circuit 220 and the transceiver interface 242 and performs a writing operation or a read operation for the memory 124 according to the information output from the processing circuit 220. In other embodiments, when the processing circuit 220 triggers the memory controller 241A, the memory controller 241A performs a management program code COD_2 stored in the memory 270 to manage the data stored in the memory 124. In one embodiment, the memory controller 241A accesses the memory 270 via the bus 280 to read the management program code COD_2. In some embodiments, the memory controller 241A is a NAND error handling controller.

When the memory controller 241A performs the management program code COD_2, the memory controller 241A performs a wear leveling process on the memory 124. Since each memory block of the memory 124 has a fixed limit on the number of erase and write operations, if the same memory block is erased and written multiple times, it will easily cause the memory block to age, causing the access speed of the memory 124 to slow down. However, through the wear leveling process, the memory controller 241A evenly uses all the memory blocks of the memory 124 without overusing a certain memory block.

In another embodiment, the memory controller 241A performs a management program code COD_3 stored in the memory 270 to perform a garbage collection process on the memory 124. In this case, the memory controller 241A uses an algorithm to count valid data and invalid data in the memory 124. The memory controller 241A may simultaneously erase all invalid data, thereby increasing the performance of the memory 124.

In other embodiments, the memory controller 241A performs a management program code COD_4 to perform a bad block management process on the memory 124. In this case, the memory controller 241A detects the faulty memory block in the memory 124 and marks the faulty memory block to prevent data from being written into the faulty memory block. In another embodiment, the memory 124 has redundant memory blocks. In this case, the memory controller 241A uses the redundant memory blocks to replace the failed memory blocks, thereby increasing the usable time of the memory 124.

The transceiver interface 242 is coupled between the memory controller 241A and the memory 124. In one embodiment, the transceiver interface 242 is a memory transceiver interface. The protocol for data transmission between the transceiver interface 242 and the memory 124 is a parallel transmission protocol. In other words, the transceiver interface 242 uses a parallel transmission method to transmit the parallel data to the memory 124 and uses the parallel transmission method to receive the parallel data from the memory 124. In this embodiment, the data transmission format between the transceiver interface 242 and the memory 124 is different from the data transmission format between the processing circuit 220 and the transceiver interfaces 230, 250, and 260. However, the protocol for data transmission between the transceiver interface 242 and the memory 124 is the same as the protocol for data transmission between the processing circuit 220 and the transceiver interfaces 230, 250, and 260, such as a parallel transmission protocol.

In other embodiments, the control chip 122A further comprises a storage circuit 275. When the upstream-facing port 121 receives an access command which points to the memory 124, the processing circuit 220 first stores the write data which may be provided from the host device 110 or the electronic device 180 in the storage circuit 275. When the amount of data in the storage circuit 275 reaches a target value, the processing circuit 220 provides the data stored in the storage circuit 275 to the processing circuit 240A. The processing circuit 240A writes the data provided by the processing circuit 220 to the memory 124. Since the storage circuit 275 stores the external data, the processing circuit 240A does not need to frequently write data to the memory 124, so the efficiency of the processing circuit 240A can be improved. In one embodiment, the storage circuit 275 is a static random-access memory (SRAM).

In this embodiment, since the protocol for data transmission between the processing circuits 220 and 240A is a parallel transmission protocol and the protocol for data transmission between the processing circuit 240A and the memory 124 is also the parallel transmission protocol, the processing circuit 240A does not need to perform format conversion (such as converting from a parallel format to a serial format). Therefore, the processing circuit 240A does not need to use the conversion circuit (such as USB transceiver PHY) manufactured by advanced processes, thereby reducing the component cost of the hub device 120A.

Additionally, during performing data conversion (such as converting from a parallel format to a serial format), additional power loss will be incurred. However, since the processing circuit 240A does not perform format conversion, the power consumption of the control chip 122A can be reduced. By reducing the power consumption of the control chip 122A, the hub device 120A can be prevented from overheating. Therefore, there is no need to set up additional heat dissipation devices around the hub device 120A.

Figure 2B:
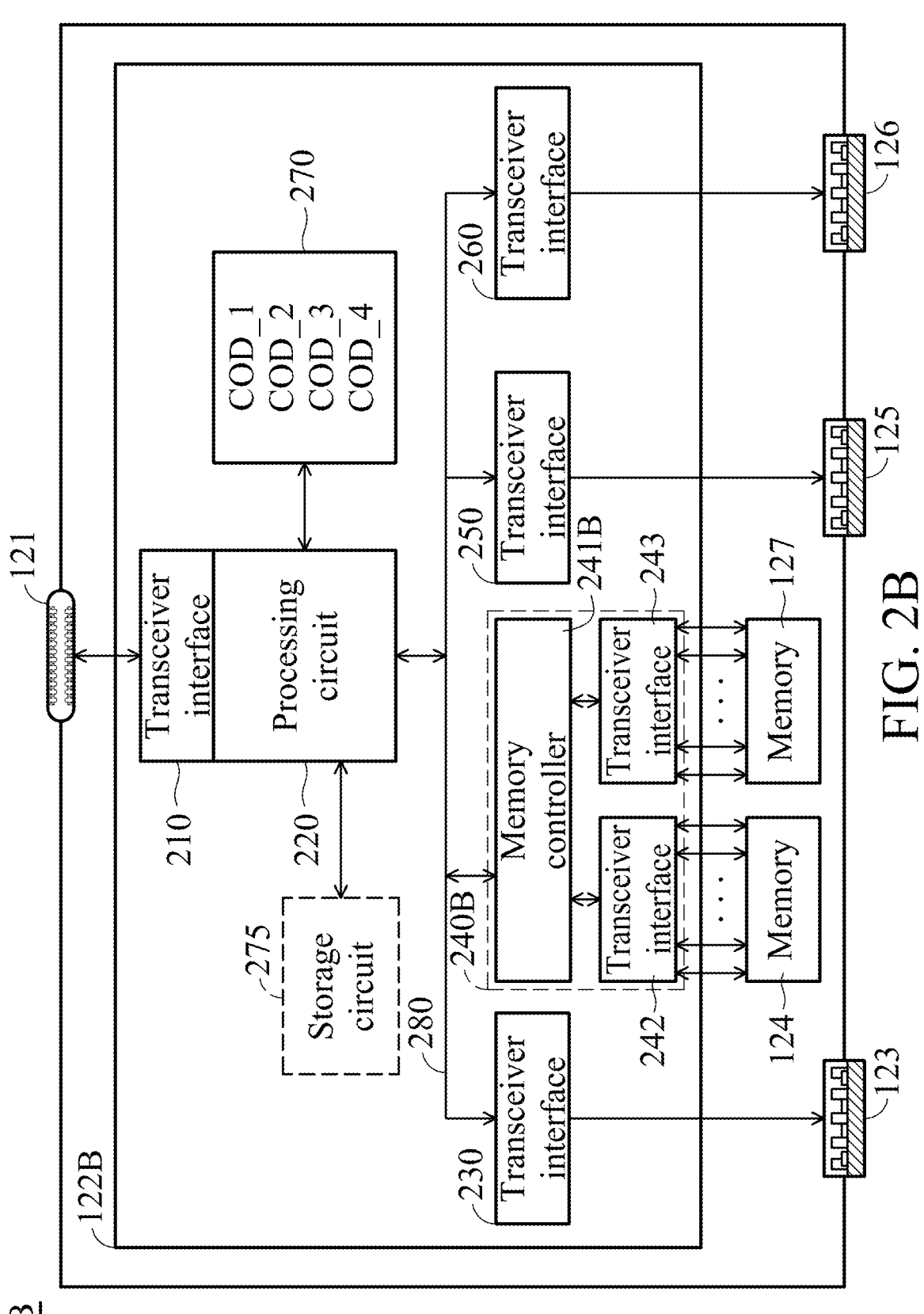
FIG. 2B is a schematic diagram of another exemplary embodiment of a hub device according to various aspects of the present disclosure.

FIG. 2B is a schematic diagram of another exemplary embodiment of a hub device according to various aspects of the present disclosure. FIG. 2B is similar to FIG. 2A with the exception that the processing circuit 240B shown in FIG. 2B further comprises a transceiver interface 243. The transceiver interface 243 is coupled between the memory controller 241B and the memory 127. The memory controller 241B accesses the memories 124 and 127 via the transceiver interfaces 242 and 243. Since the characteristics of the transceiver interface 243 are similar to the characteristics of the transceiver interface 242, the related description is omitted here.

When the control chip 122B enters a first writing mode, the memory controller 241B distributes the data from the host device 110 into the memories 124 and 127. In one embodiment, when the host device 110 sends an access request, the memory controller 241B reads the memories 124 and 127 to provide the data required by the host device 110.

When the control chip 122B enters a second writing mode, the memory controller 241B stores the specific data from the host device 110 in the memories 124 and 127 simultaneously. In one embodiment, when the host device 110 sends an access request, the memory controller 241B may read the memory 124. In this case, the memory 127 serves as a backup memory. When the data stored in the memory 124 is damaged, the memory controller 241B copies the data stored in the memory 127 to the memory 124.

It will be understood that when an element is referred to as being "coupled to" another element, it can be directly coupled to the other element or intervening may be present. In contrast, when an element r is referred to as be "directly coupled to" another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another. In the following claims, the terms "first," "second," etc. are used merely as labels, and are not intended to impose numerical requirements on their objects.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hub device comprising:
an upstream-facing port coupled to a host device;
a first downstream-facing port coupled to a first peripheral device;
a first memory; and
a control chip coupled to the upstream-facing port, the first downstream-facing port, and the first memory and comprising:
    a first transceiver interface coupled to the upstream-facing port;
    a second transceiver interface coupled to the first downstream-facing port;
    a first processing circuit coupled to the first and second transceiver interfaces so that the host device communicates with the first peripheral device; and
    a second processing circuit coupled between the first processing circuit and the first memory,
wherein:
in response to the first processing circuit receiving an access command from the host device via the first transceiver interface, the first processing circuit triggers the second processing circuit to access the first memory.

2. The hub device as claimed in claim 1, wherein the control chip further comprises:
a third transceiver interface coupled to a second downstream-facing port; and
a second memory storing a first management program code and a second management program code,
wherein the first processing circuit executes the first management program code to transmit information from the first transceiver interface to the second or third transceiver interface.

3. The hub device as claimed in claim 2, wherein in response to the first processing circuit triggering the second processing circuit, the second processing circuit executes the second management program code to manage the data stored in the first memory.

4. The hub device as claimed in claim 2, wherein the upstream-facing port is a USB Type-C connection port, and the first or second downstream-facing port is a USB Type-A connection port or a USB Type-C connection port.

5. The hub device as claimed in claim 2, wherein the second processing circuit comprises:
a fourth transceiver interface coupled to the first memory;
a fifth transceiver interface coupled to a third memory; and
a memory controller coupled to the first processing circuit, and the fourth and fifth transceiver interfaces,
wherein:
the fourth transceiver interface outputs parallel data to the first memory,
the second transceiver interface outputs first serial data to the first downstream-facing port,
the third transceiver interface outputs second serial data to the second downstream-facing port.

6. The hub device as claimed in claim 5, wherein the memory controller divides specific data provided by the first processing circuit and distributes the divided data in the first and third memories via the fourth and fifth transceiver interfaces.

7. The hub device as claimed in claim 6, wherein the memory controller divides the specific data into a plurality of data groups, the memory controller stores a first data group of the data groups in the first memory via the fourth transceiver interface, stores a second data group of the data groups in the third memory via the fifth transceiver interface, stores a third data group of the data groups in the first memory via the fourth transceiver interface, and stores a fourth data group of the data groups in the third memory via the fifth transceiver interface.

8. The hub device as claimed in claim 5, wherein the memory controller uses the fourth and fifth transceiver interfaces to store specific data provided by the first processing circuit in the first and third memories simultaneously.

9. The hub device as claimed in claim 5, wherein the control chip further comprises:
a fifth memory,
wherein:
the memory controller stores specific data provided by the first processing circuit to the fifth memory,
in response to the amount of data in the fifth memory reaching a target value, the first processing circuit outputs the data stored in the fifth memory to the memory controller.

10. The hub device as claimed in claim 9, wherein the fifth memory is a random-access memory and the first memory is a non-volatile memory.

11. The hub device as claimed in claim 5, wherein the first memory is a first flash and the third memory is a second flash.

12. A control system comprising:
a host device;
a peripheral device; and
a hub device responsible for communication between the host device and the peripheral device and comprising:
    an upstream-facing port coupled to the host device;
    a downstream-facing port coupled to the peripheral device;
    a memory; and
    a control chip coupled to the upstream-facing port, the downstream-facing port, and the memory and comprising:
        a first transceiver interface coupled to the upstream-facing port;
        a second transceiver interface coupled to the downstream-facing port;
        a first processing circuit coupled to the first and second transceiver interfaces so that the host device communicates with the peripheral device; and
        a second processing circuit coupled between the first processing circuit and the memory,
wherein:
in response to the first processing circuit receiving an access command from the host device via the first transceiver interface, the first processing circuit triggers the second processing circuit to access the memory.

13. The control system as claimed in claim 12, wherein the first processing circuit receives write data from the host device via the first transceiver interface, and writes the write data to the memory via the second processing circuit.

14. The control system as claimed in claim 13, wherein the first processing circuit reads the memory via the second processing circuit to generate read data, and outputs the read data to the host device via the first transceiver interface.

15. The control system as claimed in claim 14, wherein the first transceiver interface is a local area network (LAN) connection port.

16. The control system as claimed in claim 12, further comprising:

an electronic device coupled to an internet, wherein the host device is coupled to the internet, and the host device is an access point (AP).

\* \* \* \* \*